US007857902B2

(12) United States Patent
Chou

(10) Patent No.: US 7,857,902 B2
(45) Date of Patent: Dec. 28, 2010

(54) METHOD OF PREPARING NON-TOXIC WATER PAINT

(76) Inventor: Yu-Chun Chou, P.O. Box 44-2049, Taipei (TW) 10668

( * ) Notice: Subject to any disclaimer, the term of this patent is extended or adjusted under 35 U.S.C. 154(b) by 254 days.

(21) Appl. No.: 12/285,480

(22) Filed: Oct. 7, 2008

(65) Prior Publication Data

US 2010/0087594 A1 Apr. 8, 2010

(51) Int. Cl.

| | |
|---|---|
| ***C08L 5/08*** | (2006.01) |
| ***C08L 5/10*** | (2006.01) |
| ***C08L 1/18*** | (2006.01) |
| ***C09D 105/08*** | (2006.01) |
| ***C09D 105/10*** | (2006.01) |
| ***C09D 101/18*** | (2006.01) |
| ***C09J 105/08*** | (2006.01) |
| ***C09J 105/10*** | (2006.01) |
| ***C09J 101/18*** | (2006.01) |

(52) U.S. Cl. .............................. 106/162.2; 106/169.01

(58) Field of Classification Search ............ 106/169.01, 106/162.2

See application file for complete search history.

(56) References Cited

U.S. PATENT DOCUMENTS

| | | | | | |
|---|---|---|---|---|---|
| 767,944 | A | * | 8/1904 | Kitsee | 106/169.01 |
| 1,816,146 | A | * | 7/1931 | Ellis | 536/35 |
| 2,099,501 | A | * | 11/1937 | Speicher | 106/169.01 |
| 2,221,708 | A | * | 11/1940 | Hodgins | 526/71 |
| RE22,124 | E | * | 6/1942 | Ellis | 524/25 |
| 2,937,153 | A | * | 5/1960 | Rasmussen et al. | 524/33 |
| 3,003,978 | A | * | 10/1961 | Coney et al. | 523/448 |
| 3,087,835 | A | * | 4/1963 | Auer | 427/397 |
| 3,450,652 | A | * | 6/1969 | Lin | 524/33 |
| 3,451,883 | A | * | 6/1969 | Plunguian | 149/14 |
| 3,522,070 | A | * | 7/1970 | Webb, Jr. | 106/169.01 |
| 3,793,302 | A | * | 2/1974 | Berstein et al. | 523/220 |
| 3,990,869 | A | * | 11/1976 | Forney | 95/196 |
| 4,125,521 | A | * | 11/1978 | Murakami et al. | 528/274 |
| 4,177,172 | A | * | 12/1979 | Traenckner et al. | 524/31 |
| 4,285,743 | A | * | 8/1981 | Inoue et al. | 149/2 |
| 4,404,298 | A | * | 9/1983 | Traenckner et al. | 524/31 |
| 4,421,881 | A | * | 12/1983 | Benkendorf et al. | 524/24 |
| 4,649,045 | A | * | 3/1987 | Gaske et al. | 424/61 |
| 4,814,015 | A | * | 3/1989 | Quinlan | 106/169.43 |
| 5,143,970 | A | * | 9/1992 | Ahmed | 524/710 |
| 5,254,161 | A | * | 10/1993 | DeVido et al. | 106/169.1 |
| 5,284,885 | A | * | 2/1994 | Nehra | 524/31 |
| 5,331,027 | A | * | 7/1994 | Whitbourne | 524/37 |
| 5,578,297 | A | * | 11/1996 | Mellul et al. | 424/70.7 |
| 5,830,443 | A | * | 11/1998 | Lee | 424/61 |
| 5,985,987 | A | * | 11/1999 | Adolfsson et al. | 524/593 |
| 6,022,549 | A | * | 2/2000 | Dyer | 424/401 |

* cited by examiner

*Primary Examiner*—Mark Eashoo
*Assistant Examiner*—Liam J Heincer

(57) ABSTRACT

In a method of preparing a non-toxic anti-tacky water paint, nitrocellulose is solubilized in n-butyl acetate to form a nitrocellulose solution, which is then mixed with urea-formaldehyde and water to form a first mixture solution, which is then heated for two to three hours via water at a temperature of 65 to 90° C. so that the first mixture solution is separated into an upper layer of liquid and a lower layer of powder. Next, the upper layer is removed, and ethylene glycol monobutyl ether is added to the lower layer to form a second mixture solution. Then, a non-ionic surfactant is added to the second mixture solution to form a third mixture solution. Finally, the third mixture solution is added to a water-soluble paint to obtain the non-toxic anti-tacky water paint, which may be coated on a container object so that the object can be conveniently transported and stored.

12 Claims, 1 Drawing Sheet

Nitrocellulose solution preparing step — 1
First mixture solution preparing step — 2
Second mixture solution preparing step — 3
Third mixture solution preparing step — 4
Product preparing step — 5

METHOD OF PREPARING NON-TOXIC WATER PAINT

BACKGROUND OF THE INVENTION (1) Field of the Invention

The invention relates to a method of preparing a water paint, and more particularly to a method of converting the oil-based nitrocellulose into the water-based material, and then mixing the water-based material with the acrylic acid water resin to form the paint having the anti-tacky property.

(2) Description of the Prior Art

The typical container object, such as a package box, furniture, a vehicle or even a building is coated with a layer of paint to protect its surface and enhance the brightness and the feel. The paints may be classified into a water paint and an oil paint. Although the water paint has been developed for a long time, the single water paint that is currently used still has the aftertack problem so that the container objects being transported or stored adhere to each other or one another to damage the surface paint or to lower the brightness, or even to damage the container objects.

Although the oil paint cannot encounter the aftertack problem, the currently used oil paint has the volatile substance serving as the solvent, such as toluene, which is a relatively toxic material and is harmful to the health of the operator for processing the paint as well as to the person who has touched the container object coated with the oil paint. Thus, the use of the oil paint is limited, and the oil paint cannot be applied to the container object associated with foods.

SUMMARY OF THE INVENTION

In view of the aftertack problem of the water paint and the drawback that the oil paint has the toxic property, the present inventor has paid attention to the research and development and experiments, and thus developed this method of preparing the non-toxic anti-tacky water paint.

An object of the invention is to provide a method of preparing a non-toxic water paint, wherein the method can convert the oil-based nitrocellulose into the water-based material, and mix the water-based material with the acrylic acid water resin to prepare the non-toxic and anti-tacky paint.

The invention achieves the above-identified object by providing a method of preparing a non-toxic anti-tacky water paint. The method includes the following steps.

Nitrocellulose ranging from 30 wt % to 40 wt % is solubilized in n-butyl acetate ranging from 60 wt % to 70 wt % to form a nitrocellulose solution. The nitrocellulose solution is mixed with urea-formaldehyde (UF) and water to form a first mixture solution, and the first mixture solution is heated via water for 2 to 3 hours at a temperature ranging from 65 to 90° C. to separate the first mixture solution into upper and lower layers, wherein the lower layer is precipitated powder, and the upper layer is liquid.

Next, the upper layer of liquid is removed, and ethylene glycol monobutyl ether, which has a volume greater than or equal to two times of a volume of the powder, is added to the lower layer of powder to form a second mixture solution.

Then, a non-ionic surfactant is added to the second mixture solution to form a third mixture solution.

Finally, the third mixture solution ranging from 3 wt % to 15 wt % is added to a water-soluble paint to obtain the anti-tacky water paint.

Preferably, a volume ratio of the nitrocellulose solution, the urea-formaldehyde and the water in the first mixture solution is about 1:1:2.

Preferably, the water in the first mixture solution is distilled water without mineral.

Preferably, the first mixture solution is heated via the water at the temperature of 80° C.

Preferably, a volume of the ethylene glycol monobutyl ether added to the lower layer of powder is two to three times of a volume of the powder.

Preferably, the non-ionic surfactant added to the second mixture solution occupies 20 wt % of the overall third mixture solution.

Preferably, the water-soluble paint is acrylic acid resin (i.e., ACRYLIC).

Thus, the effects obtained according to the technological means of the invention are listed in the following.

First, the typical nitrocellulose serves as the basic material of the oil paint. However, the method of the invention is to convert the oil-based material into the water-based material and then add the water-based material to the water-soluble paint so that the obtained water paint becomes non-toxic and has the anti-tacky effect. So, after the paint is coated on a container object, the container object can be conveniently transported and stored without damage.

Second, the method of the invention does not have to use the benzodiazepines toxic volatilize solvent. Thus, either the operator or the user for processing the paint can use the paint without worrying about the toxic contamination and the paint can be safely applied to the food package.

Further aspects, objects, and desirable features of the invention will be better understood from the detailed description and drawings that follow in which various embodiments of the disclosed invention are illustrated by way of examples.

DETAILED DESCRIPTION OF THE PREFERRED EMBODIMENTS

Figure 1:
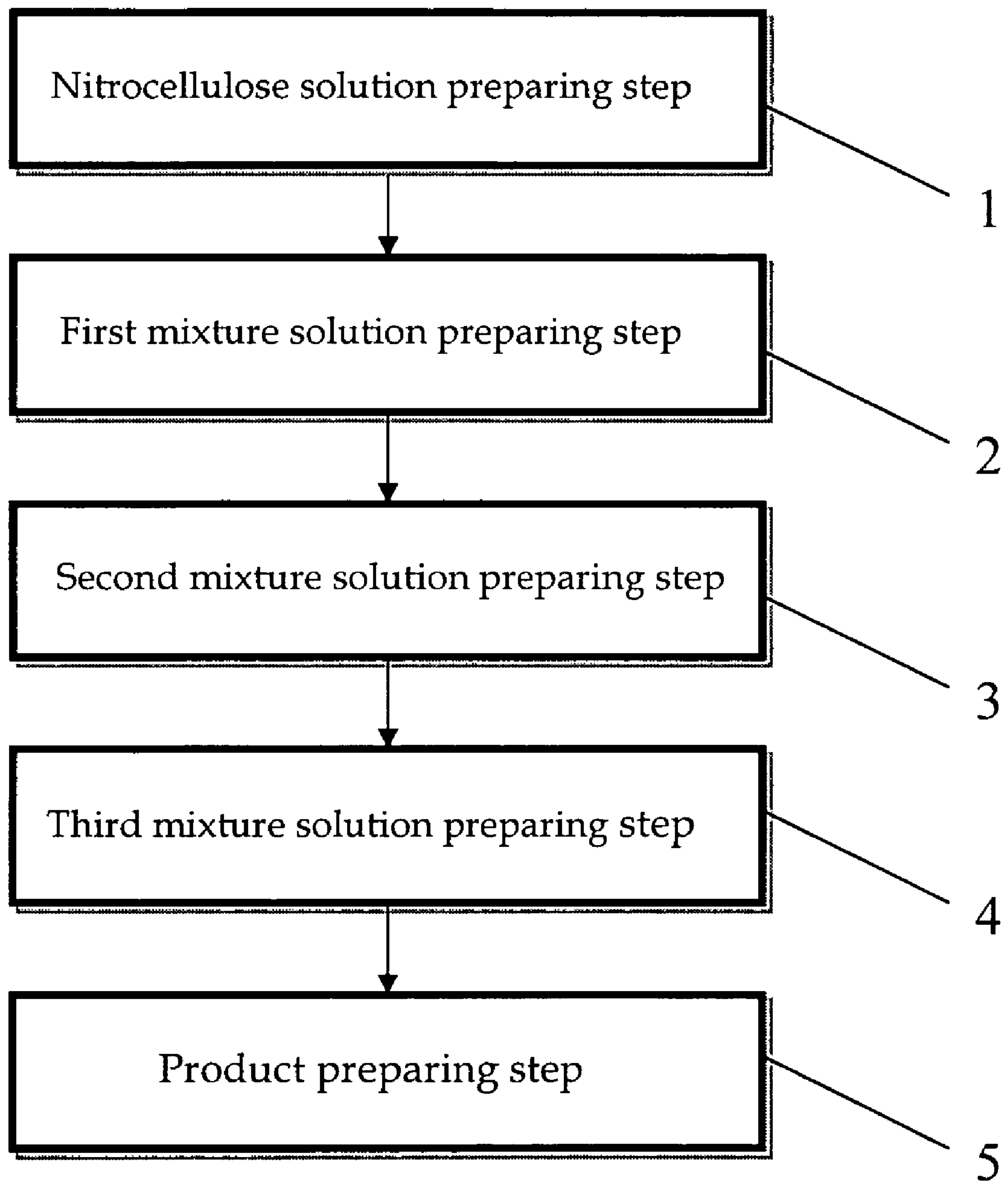
FIG. 1 is a block diagram showing a method of preparing non-toxic water paint according to the invention.

Referring to FIG. 1, the method of preparing a non-toxic anti-tacky water paint according to the invention includes the following steps.

In a nitrocellulose solution preparing step (1), nitrocellulose ranging from 30 wt % to 40 wt % is solubilized in n-butyl acetate ranging from 60 wt % to 70 wt % at a room temperature to form a nitrocellulose solution.

In a first mixture solution preparing step (2), the nitrocellulose solution, urea-formaldehyde (UF) and distilled water are mixed with a volume ratio of 1:1:2 to form a first mixture solution, and the first mixture solution is heated for two to three hours via water at a temperature ranging from 65 to 90° C. to separate the first mixture solution into upper and lower layers. The preferred heating temperature is 80° C., the lower layer is precipitated powder, and the upper layer is liquid.

In a second mixture solution preparing step (3), the upper layer of liquid of the first mixture solution is removed, and the lower layer of powder is dried. Then, ethylene glycol monobutyl ether, which has the volume greater than or equal to two to three times of the volume of the powder, is added to the powder to form a second mixture solution so that a hydrophilic function group is introduced into the nitrocellulose.

In a third mixture solution preparing step (4), a non-ionic surfactant is added to the second mixture solution to form a third mixture solution, wherein the non-ionic surfactant occupies 20 wt % of the overall third mixture solution, the non-ionic surfactant includes a low-foam surfactant (e.g., EO/PO copolymer or the like), a tackifier (e.g., cocoamide DEA), a pearlizing agent (EGDS) or any other non-ionic surfactant known in the art.

In a product preparing step (5), the third mixture solution ranging from 3 wt % to 15 wt % is added to an acrylic acid resin paint to obtain the non-toxic anti-tacky water paint.

Embodiment

The following embodiment is illustrated to make one of ordinary skill in the art easily understand the preparing method of the invention and does not intend to limit the scope of the invention.

First, 35 wt % of the nitrocellulose is solubilized in 65 wt % of the n-butyl acetate to form the nitrocellulose solution. Next, the nitrocellulose solution is mixed with the urea-formaldehyde and the water to form the first mixture solution, and then the first mixture solution is heated for two to three hours via water at the temperature of 80° C. so that the first mixture solution is separated into the upper layer of liquid and the lower layer of powder. Then, the upper layer of liquid is removed, and then the ethylene glycol monobutyl ether, which has the volume greater than or equal to three times of the volume of the powder, is added to the powder to form the second mixture solution. Next, 20 wt % of the non-ionic surfactant is added to the second mixture solution to form the third mixture solution. Finally, 10 wt % of the third mixture solution with the non-ionic surfactant is added to the acrylic acid resin to obtain the non-toxic anti-tacky water paint.

The typical nitrocellulose serves as the basic material of the oil paint, which has to use the toxic volatile solvent. However, the method of the invention is to convert the oil-based material into the water-based material and then add the water-based material to the water-soluble paint so that the obtained water paint becomes non-toxic and has the anti-tacky effect without the use of the volatile solvent. Thus, the paint operator or user does not have to worry about it, and the paint can be safely used in the food package container object. Furthermore, although the paint of the invention is water-soluble, it can achieve the anti-tacky effect the same as that of the oil paint. So, after the paint is coated on the container object, the container object can be conveniently transported and stored.

New characteristics and advantages of the invention covered by this document have been set forth in the foregoing description. It is to be expressly understood, however, that the drawings are for the purpose of illustration only and are not intended as a definition of the limits of the invention. Changes in methods, shapes, structures or devices may be made in details without exceeding the scope of the invention by those who are skilled in the art. The scope of the invention is, of course, defined in the language in which the appended claims are expressed.

What is claimed is:

1. A method of preparing a non-toxic anti-tacky water paint, the method comprising the steps of:

solubilizing nitrocellulose ranging from 30 wt % to 40 wt % in n-butyl acetate ranging from 60 wt % to 70 wt % to form a nitrocellulose solution;

mixing the nitrocellulose solution with urea-formaldehyde (UF) and water to form a first mixture solution, and heating the first mixture solution via water for 2 to 3 hours at a temperature ranging from 65 to 90° C. to separate the first mixture solution into upper and lower layers, wherein the lower layer is precipitated powder, and the upper layer is liquid;

removing the upper layer of liquid, and adding ethylene glycol monobutyl ether, which has a volume greater than or equal to two times of a volume of the powder, to the lower layer of powder to form a second mixture solution;

adding a non-ionic surfactant to the second mixture solution to form a third mixture solution; and adding the third mixture solution ranging from 3 wt % to 15 wt % to a water-soluble paint to obtain the anti-tacky water paint.

2. The method according to claim 1, wherein a volume ratio of the nitrocellulose solution, the urea-formaldehyde and the water in the first mixture solution is about 1:1:2.

3. The method according to claim 2, wherein the water in the first mixture solution is distilled water without mineral.

4. The method according to claim 3, wherein the first mixture solution is heated via the water at the temperature of 80° C.

5. The method according to claim 4, wherein a volume of the ethylene glycol monobutyl ether added to the lower layer of powder is two to three times of the volume of the powder.

6. The method according to claim 5, wherein the non-ionic surfactant added to the second mixture solution occupies 20 wt % of the overall third mixture solution.

7. The method according to claim 1, wherein the water-soluble paint is an acrylic acid resin.

8. The method according to claim 2, wherein the water-soluble paint is an acrylic acid resin.

9. The method according to claim 3, wherein the water-soluble paint is an acrylic acid resin.

10. The method according to claim 4, wherein the water-soluble paint is an acrylic acid resin.

11. The method according to claim 5, wherein the water-soluble paint is an acrylic acid resin.

12. The method according to claim 6, wherein the water-soluble paint is an acrylic acid resin.

* * * * *